Figure 1:
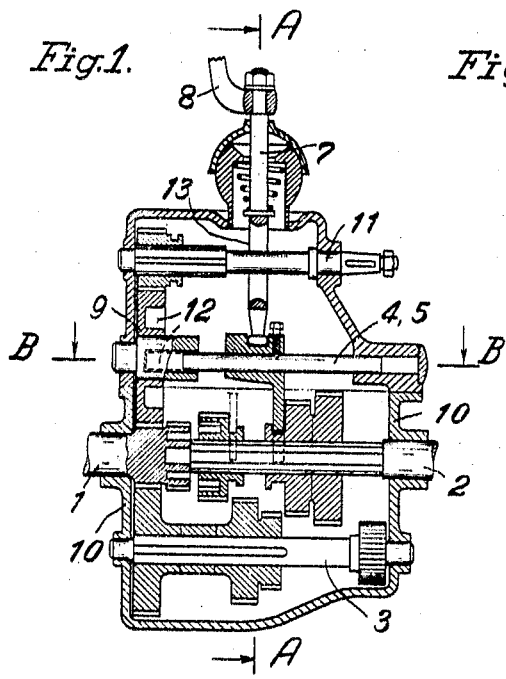

March 11, 1930.   A. MAIER   1,749,828

GEAR

Filed Jan. 18, 1929

Inventor:

Patented Mar. 11, 1930

1,749,828

UNITED STATES PATENT OFFICE

ALBERT MAIER, OF FRIEDRICHSHAFEN, GERMANY, ASSIGNOR TO ZAHNRADFABRIK AKTIENGESELLSCHAFT, OF FRIEDRICHSHAFEN, GERMANY

GEAR

Application filed January 18, 1929, Serial No. 333,361, and in Germany January 26, 1928.

My invention relates to gears and has special reference to change speed gears in motor vehicles. In many cases the motor is wanted not only for driving the car but also for driving some auxiliary machine or lifting apparatus, pump, fire ladder or the like.

Especially in these latter cases it has always been the desire to have the power shaft of the gearing which is to drive the additional machine substantially in the middle thereof and if possible right above the driving and driven shafts of the vehicle. When using substantially centrally situated striker rods operated by a lever which is also situated substantially centrally the gear box must be extremely enlarged to solve this problem.

According to my invention there is no necessity of altering the horizontal dimensions of the gear box but only the upper portion or even only the cover is changed. I provide an intermediate wheel above the ordinary gear wheels and shafts, approximately in the plane of the striker rods therefor. This wheel I provide with a central aperture or indenture and with annular grooves on the inner side face towards the striker rods, so that these may enter into these openings when being shifted in the direction towards this wheel.

Furthermore I put the power shaft driven by said intermediate wheel substantially above the driving and driven shafts and journal it, in the upper portion of the gear box, for example, in the cover thereof. The lever for shifting the striker rods, according to my invention, is bent around the upper power shaft so as not to intervene therewith. The preferred construction, according to my invention. is to give the lever in its middle portion where the power shaft is situated the shape of an eye or the like with an opening therein so that this shaft extends right through this more or less eye-shaped aperture.

The invention will be understood best having reference to the drawing which represents an example embodying my invention.

Figure 2:
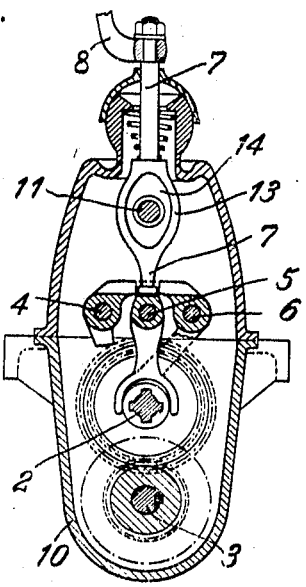
Figure 3:
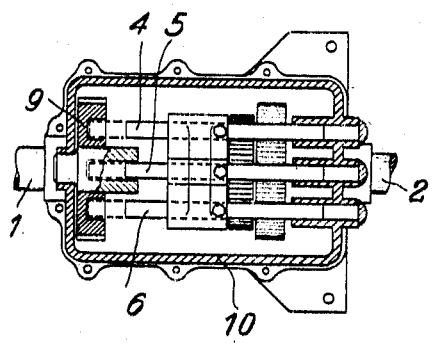

Fig. 1 is a longitudinal vertical section through a change speed gear; Fig. 2 is a transverse vertical section taken on line A—A of Fig. 1; and Fig. 3 is a horizontal section taken on line B—B of Fig. 1.

The main shafts are 1 and 2, whereas 3 is the normal stub shaft of the speed gear. There are three striker rods, 4, 5 and 6, which serve for shifting the gears (not specially designated) on the shafts, in any well known manner. The striker rods are operated by lever 7, which in its upper part 8 may be shaped so as to best suit the purposes.

An intermediate spur wheel 9 journaled in the casing 10 or in the cover thereto serves for driving additional shaft 11 adapted for driving a pump or whatever supplementary machine there may be. This shaft 11 is situated right above the two main shafts 1 and 2 for which purpose wheel 9 has indentures and grooves 12 in which the ends of striker rods 4, 5 and 6 are received so that the gear box 10 need not be longer than usual. Lever 7 in its middle portion 13 is eye-like shaped and has an opening or aperture 14 through which shaft 11 passes.

Thus, according to my invention, it is possible to install an additional symmetrically situated shaft in any gear box simply by exchanging the cover or upper portion thereof and by making use of my special shape of the operating lever.

I do not want to be limited to the exact details described or shown in the drawings, as many variations will occur to those skilled in the art.

What I claim is:

1. In a motor vehicle the combination of an ordinary change speed gear with an additional power shaft, said power shaft being situated substantially centrally above said speed gear, said combination comprising a driving shaft, a driven shaft, ordinary speed gears connecting said two shafts, striker rods for shifting said gears, a lever for operating said striker rods, said striker rods being situated above said gears, said lever extending substantially vertically, an additional power shaft, an intermediate wheel adapted to be driven by said speed gear and to drive said power shaft, said wheel being situated substantially opposite to said striker rods and having indentures adapted to receive the ends of said striker rods when shifted towards said wheel.

2. In a motor vehicle the combination of an ordinary change speed gear with an additional power shaft, said power shaft, being situated substantially centrally above said speed gear, said combination comprising a driving shaft, a driven shaft, ordinary speed gears connecting said two shafts, striker rods for shifting said gears, a lever for operating said striker rods, said striker rods being situated above said gears, said lever extending substantially vertically, an additional power shaft, an intermediate wheel adapted to be driven by said speed gear and to drive said power shaft, said wheel being situated substantially opposite to said striker rods and having indentures adapted to receive the ends of said striker rods when shifted towards said wheel, said lever being shaped so as to allow for said shaft to pass.

3. In a motor vehicle the combination of an ordinary change speed gear with an additional power shaft, said power shaft being situated substantially centrally above said speed gear, said combination comprising a driving shaft, a driven shaft, ordinary speed gears connecting said two shafts, striker rods for shifting said gears, a lever for operating said striker rods, said striker rods being situated above said gears, said lever extending substantially vertically, an additional power shaft, an intermediate wheel adapted to be driven by said speed gear and to drive said power shaft, said wheel being situated substantially opposite to said striker rods and having indentures adapted to receive the ends of said striker rods when shifted towards said wheel, said lever in its middle portion having an eye-like shape with an opening therein, said power shaft passing through said eye opening.

ALBERT MAIER.